(12) United States Patent
Bandil et al.

(10) Patent No.: US 10,336,382 B2
(45) Date of Patent: Jul. 2, 2019

(54) TRACK VEHICLE WITH FLUIDLY DAMPED IDLER RECOIL SYSTEM

(71) Applicant: CNH Industrial America LLC, New Holland, PA (US)

(72) Inventors: Sanjeev K. Bandil, Greater Noida (IN); Anthony J. Lamela, Gilberts, IL (US); Bruce Arndt, Algonquin, IL (US)

(73) Assignee: CNH Industrial America LLC, New Holland, PA (US)

(*) Notice: Subject to any disclaimer, the term of this patent is extended or adjusted under 35 U.S.C. 154(b) by 415 days.

(21) Appl. No.: 15/014,649

(22) Filed: Feb. 3, 2016

(65) Prior Publication Data
US 2017/0217517 A1 Aug. 3, 2017

(51) Int. Cl.
*B62D 55/30* (2006.01)
*B62D 55/06* (2006.01)
*B62D 55/14* (2006.01)
*E02F 3/76* (2006.01)

(52) U.S. Cl.
CPC ............. *B62D 55/30* (2013.01); *B62D 55/06* (2013.01); *B62D 55/14* (2013.01); *E02F 3/7609* (2013.01)

(58) Field of Classification Search
CPC .............................. B62D 55/30; B62D 55/305
See application file for complete search history.

(56) References Cited

U.S. PATENT DOCUMENTS

| | | | |
|---|---|---|---|
| 3,765,730 A | 10/1973 | Ishida | |
| 3,901,563 A | 8/1975 | Day | |
| 4,149,757 A | 4/1979 | Meisel, Jr. | |
| 4,323,283 A | 4/1982 | Muramoto et al. | |
| 5,511,868 A | 4/1996 | Eftefield | |
| 5,984,436 A * | 11/1999 | Hall | B62D 55/30 305/143 |
| 6,305,762 B1 * | 10/2001 | Oertley | B62D 55/06 305/143 |

(Continued)

FOREIGN PATENT DOCUMENTS

DE 3507805 A1 9/1986
JP 61155073 A 7/1986

OTHER PUBLICATIONS

European Search Report for European Patent Application No. 17154109.7 dated Jul. 12, 2017 (6 pages).

*Primary Examiner* — Jason R Bellinger
(74) *Attorney, Agent, or Firm* — Peter K. Zacharias; Patrick M. Sheldrake

(57) ABSTRACT

A track vehicle includes: a frame; a rotatable driving wheel carried by the frame; a track engaged with the driving wheel; an idler wheel engaged with the track; a tensioner coupled to the idler wheel to force the idler wheel into engagement with the track; a recoiler coupled to the tensioner; and a fluid damper attached to the frame and coupled to the tensioner and the recoiler. The fluid damper includes: a fluid chamber having two ports; a piston coupled to at least one of the tensioner and the recoiler within the fluid chamber; and a restriction circuit fluidly connected to the ports and configured to form a closed fluid circuit. The restriction circuit permits a substantially unrestricted fluid flow through the closed fluid circuit when the piston moves in one direction and a restricted fluid flow through the closed fluid circuit when the piston moves in the opposite direction.

20 Claims, 5 Drawing Sheets

(56) References Cited

U.S. PATENT DOCUMENTS

| | | | |
|---|---|---|---|
| 6,929,334 B2* | 8/2005 | Verheye | A01D 41/02 137/255 |
| 7,172,257 B2* | 2/2007 | Tamaru | B62D 55/30 305/125 |
| 7,914,087 B2 | 3/2011 | Alfthan | |
| 2003/0117017 A1* | 6/2003 | Hoff | B62D 55/30 305/143 |
| 2003/0122422 A1 | 7/2003 | Hoff et al. | |

* cited by examiner

TRACK VEHICLE WITH FLUIDLY DAMPED IDLER RECOIL SYSTEM

BACKGROUND OF THE INVENTION

1. Field of the Invention

The present invention relates to track vehicles, and, more particularly, to track vehicles with idler recoil systems.

2. Description of the Related Art

A tracked drive is a system of vehicle propulsion in which a continuous band of treads, which can be referred to as a track, is driven by two or more wheels. This band is typically made of modular steel plates, in the case of military vehicles and construction equipment, or rubber reinforced with steel wires in the case of agricultural or lighter construction vehicles. The large surface area of the track distributes the weight of the vehicle better than wheels on an equivalent vehicle, enabling a continuous tracked vehicle to traverse soft ground with superior traction and less likelihood of becoming stuck.

To drive the track, a driving wheel, such as a sprocket, is provided that has teeth which engage chain pins provided on an interior of the track. Specifically, the chain pins can press into the space between the sprocket teeth and the sprocket teeth can press into the space between chain pins as the sprocket rotates, allowing rotation of the sprocket to also rotate the track. To keep the track taut and at the proper length during rotation, idler wheels push on and engage the track at a front and rear of the track. To adjust the amount of force the idler wheels exert on the track, a tensioner can be provided that will initially force the idler wheels into the track. This allows the track to maintain a desired front-to-rear length as the track rotates about the sprocket without slacking.

During rotation of the sprocket, material such as mud and debris can become packed into the space between the sprocket teeth and/or chain pins, causing the chain pins to raise over the outer diameter of the sprocket. Large amounts of torque bias can also cause the chain pins to raise over the outer diameter of the sprocket. When the chain pins are raised over the outer diameter of the sprocket, the length of the track in the area adjacent to the sprocket is elongated, which requires a compensatory decrease in the front-to-rear length of the track to prevent the track from becoming over-tensioned and/or snapping. Typically, the front-to-rear length is decreased by the front and rear idler wheel(s) moving closer together. Since the chain pins raising over the outer diameter is extremely difficult, if not impossible, to prevent in all cases, many track vehicles are equipped with recoil systems that push the idler wheels back into their original position after the chain pins fall back into place. The recoil systems can include, for example, a spring that compresses upon the front-to-rear length of the track being decreased, with the stored force/energy then pushing the idler wheels back into their original operating position upon the track becoming slacked.

One problem with current track vehicles with recoil systems occurs when the recoil system rapidly returns the idler wheel back to its original position to minimize the effects of a slacked track. Once the idler stops moving, due to the track tightening and/or the recoil system hitting a stop, a loud noise and shock are created that transmit through the track vehicle. The noise and shock can be so large as to disturb a user driving the track vehicle. The user, unaware of the cause of the loud noise and shock, may believe that there is something wrong with the track vehicle and discontinue operation of the track vehicle until a service check is performed. This causes unnecessary down time of the vehicle, since there has not been a malfunction in the track vehicle, and can cause a user to ignore other loud noises which may actually be indicative of a malfunction. Further, the shock transmitted through the vehicle can reduce the lifetime of the undercarriage due to the impact causing cracks, denting, and loosening of undercarriage joints.

What is needed in the art is a track vehicle with a recoil system that is less prone to causing loud noises and damaging shock during normal operation.

SUMMARY OF THE INVENTION

The present invention provides a track vehicle with a tensioner and a recoiler coupled to a fluid damper which can allow substantially unrestricted forcing on the recoiler by an idler wheel and reduce the noise and shock created when the recoiler pushes the idler wheel back into its original operating position.

The invention in one form is directed to a track vehicle including: a track frame; a driving wheel carried by the track frame and configured to rotate; a track rotatably engaged with the driving wheel; at least one idler wheel engaged with the track; a tensioner coupled to the at least one idler wheel and configured to force the at least one idler wheel into engagement with the track; a recoiler coupled to the tensioner; and a fluid damper attached to the track frame and coupled to the tensioner and the recoiler. The fluid damper includes: a fluid chamber having a first port and a second port; a piston coupled to at least one of the tensioner and the recoiler within the fluid chamber; and a restriction circuit fluidly connected to the first port and the second port and configured to form a closed fluid circuit, the restriction circuit configured to permit a substantially unrestricted fluid flow through the closed fluid circuit when the piston moves in a first direction and a restricted fluid flow through the closed fluid circuit when the piston moves in a second direction opposite to the first direction.

The invention in another form is directed to an idler system including an idler wheel; a tensioner coupled to the idler wheel; a recoiler coupled to the tensioner; and a fluid damper coupled to the tensioner and the recoiler. The fluid damper includes: a fluid chamber having a first port and a second port; a piston coupled to at least one of the tensioner and the recoiler within the fluid chamber; and a restriction circuit fluidly connected to the first port and the second port and configured to form a closed fluid circuit, the restriction circuit configured to permit a substantially unrestricted fluid flow through the closed fluid circuit when the piston moves in a first direction and a restricted fluid flow through the closed fluid circuit when the piston moves in a second direction opposite to the first direction.

An advantage of the present invention is the fluid damper can reduce the shock and noise created when the recoiler returns the idler wheel back to its desired position.

Another advantage is the fluid damper can be easily incorporated into many different track vehicle arrangements.

Yet another advantage is the fluid damper can also smooth out the return of the idler to its original operating position.

Yet another advantage is the fluid damper can have an adjustable size restriction orifice that allows for adjustments to the restricted fluid flow through the closed fluid circuit.

Yet another advantage is the adjustable size restriction orifice can be adjusted in response to changes in the viscosity of the fluid caused by fluid temperature changes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
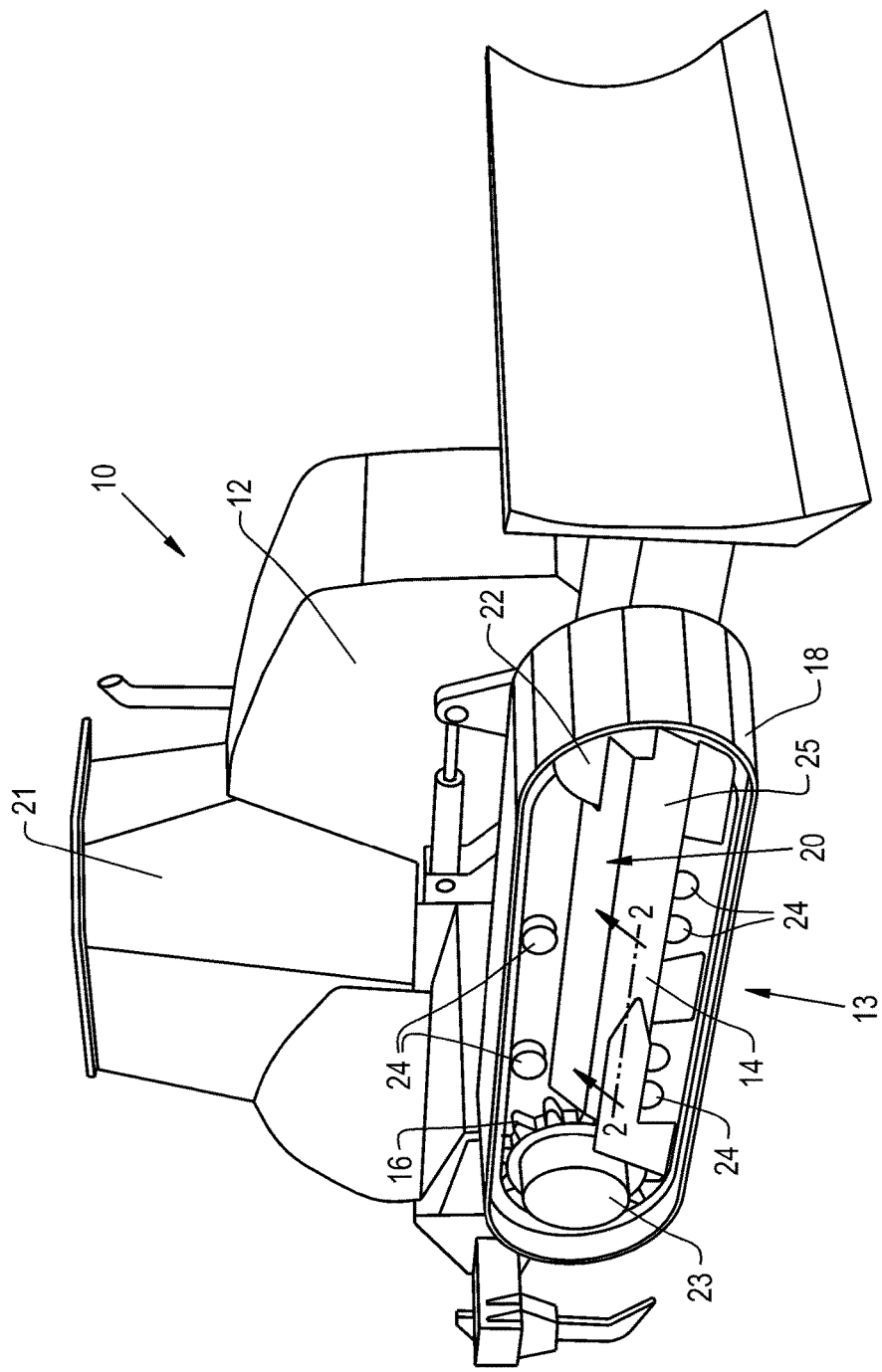
FIG. 1 is a perspective view of an embodiment of a dozer vehicle according to the present invention.

Referring now to the drawings, and more particularly to FIG. 1, there is shown an embodiment of a tracked work vehicle 10, shown as a crawler dozer, according to the present invention which generally includes a chassis 12, one or more undercarriage systems 13 carried by the chassis 12 and having a track frame 14 carrying a driving wheel 16, such as a sprocket, which rotates to drive a track 18, and an idler system 20, which can include an optional cover 25, carried by the track frame 14. The work vehicle 10 can also include a driver compartment 21 where an operator can sit and control the work vehicle 10 during operation. As can be seen, the sprocket 16 engages the track 18 so that as the sprocket 16 rotates, the track 18 also rotates about the sprocket 16 to propel the work vehicle 10 forward and backwards. The sprocket 16 can be coupled to an engine (not shown) or other power source of the work vehicle 10 by a final drive 23 to provide the power needed to rotate the sprocket 16. To maintain the track 18 as a taut, endless track, the idler system 20 includes one or more idler wheels 22 that engage the track 18. One or more of the idler wheels 22 can be placed at the front of the idler system 20, with the track 18 forming an endless track over the sprocket 16 and idler wheel 22. In some tracked vehicle configurations, one or more additional idler wheels can also be placed at the rear of the undercarriage system 13. The idler wheel 22 exerts outward force on the track 18 to keep the track 18 taut and minimize the formation of slack in the track 18. It should be appreciated that the driving wheel 16 and idler wheel 22 can have alternate arrangements to rotate the track 18 and keep the track 18 taut, with the shown embodiment illustrating only one possible arrangement. The undercarriage system 13 can also have one or more roller wheels 24 on the top and bottom to support the undercarriage system 13 and roll along the track 18 when the track 18 is propelled around the undercarriage system 13 by the sprocket 16.

Figure 2:
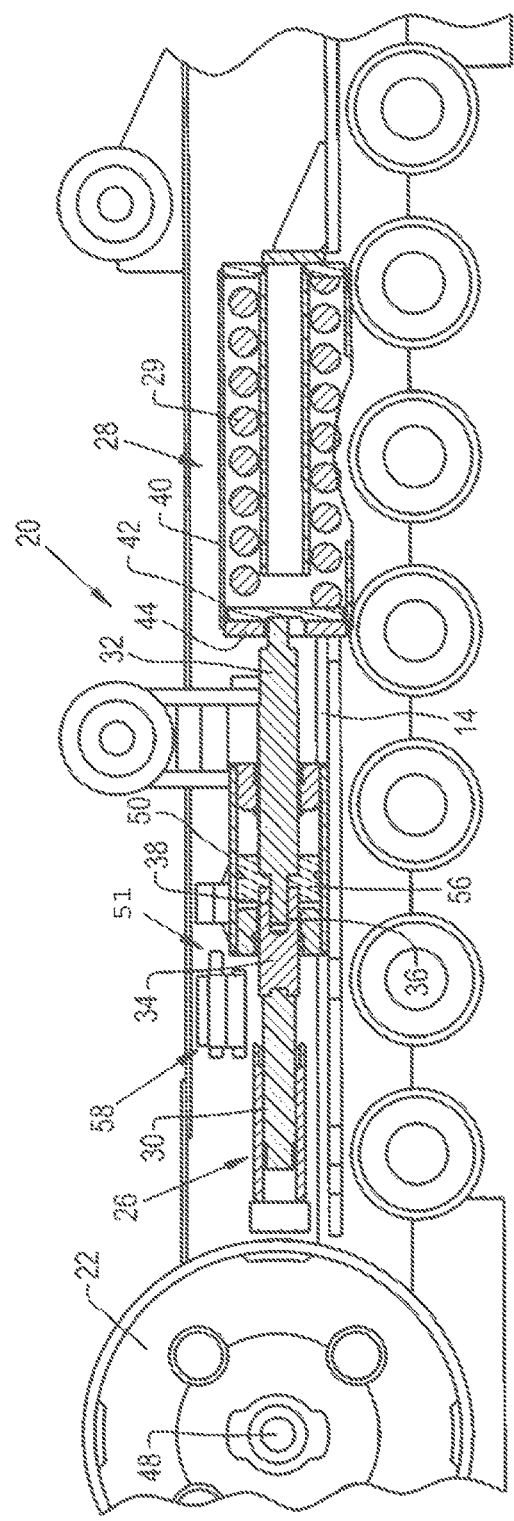
FIG. 2 is a cross-sectional view of a portion of the dozer vehicle shown in FIG. 1 taken along line 2-2.

Referring now to FIG. 2, a cross-sectional view of an embodiment of an idler system 20 according to the present invention is shown. The idler system 20 includes at least one idler wheel 22 engaged with the track 18, a tensioner 26 coupled to the idler wheel(s) 22, a recoiler 28 coupled to the tensioner 26, and a fluid damper 51 attached to the track frame 14 and coupled to the tensioner 26 and/or the recoiler 28. The tensioner 26 is configured to force the idler wheel(s) 22 into engagement with the track 18 in order to keep the track 18 taut during operation. The tensioner 26 can be, for example, a grease-filled cylinder that can increase or decrease the amount of grease in the cylinder to adjust the amount of tension applied to the idler wheel(s) 22. The tensioner 26, therefore, keeps an outwardly applied force to the idler wheel(s) 22 during operation to minimize slack in the track 18. Sometimes, the track 18 will lengthen in certain areas, such as around the sprocket 16, which requires a compensatory decrease in the length of the track 18 in other areas so the track 18 does not get over-tensioned and/or snap. To allow for the compensatory decrease in the length of the track 18, the tensioner 26 is coupled to a recoiler 28 in order to allow the idler wheel(s) 22 at the front and back of the undercarriage system 13 to move closer together when a compressing force is applied, while also allowing the idler wheel(s) 22 at the front and back to be forced back outward following the compressing force being removed. The recoiler 28 can include, for example, a compression spring 29 that compresses when the compressing force is applied to the spring 29 by the idler wheel(s) 22 through the tensioner 26. Once the compressing force is reduced and/or removed, the energy stored in the spring 29 can be spontaneously released to force the idler wheel(s) 22 back into its original operating position through the tensioner 26. This allows the idler wheel(s) 22 to spontaneously adjust to differing track conditions with a reduced risk of damaging the track 18 during operation. It should be appreciated that the described tensioner 26 and recoiler 28 are exemplary only, and any suitable tensioner and recoiler can be utilized according to the present invention.

To couple the tensioner 26 to the recoiler 28, a cylinder 30 of the tensioner 26 can be connected to a recoiler rod 32 of the recoiler 28. The cylinder 30 can have a coupling portion 34 with an opening 36 formed therein, with a coupling end 38 of the recoiler rod 32 piloted within the opening 36 to couple with the cylinder 30. The recoiler 28 can have the spring 29 held within a recoiler body 40. A pressing plate 42 can be held in the recoiler body 40 and forced toward an end 44 of the recoiler body 40 by the spring 29. The pressing plate 42 can be connected to the recoiler rod 32 such that when the recoiler rod 32 is moved toward the spring 29, the pressing plate 42 applies a compressing force to the spring 29 and compresses the spring 29. Once the compressing force is reduced and/or removed, the spring 29 then forces the pressing plate 42 back toward the end 44 of the recoiler body 40, moving the recoiler rod 32 in the process. The recoiler rod 32 then forces the tensioner 26 outward by pushing on the coupling portion 34 of the cylinder 30, pushing the idler wheel(s) 22 outward as well. It should be appreciated that the described coupling of the tensioner 26 to the recoiler 28 is exemplary only, and other suitable ways to couple the tensioner 26 to the recoiler 28 can be utilized according to the present invention.

Figure 6:
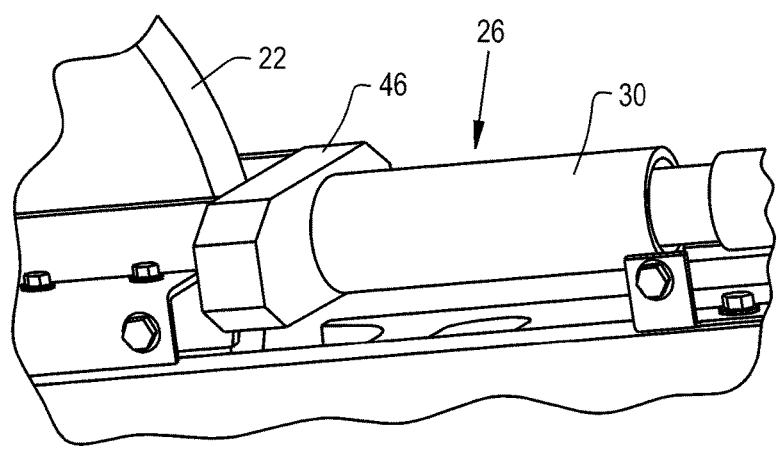
FIG. 6 is a perspective view of a coupling between the fluid damper shown in FIGS. 2-4 and an idler wheel.

Referring now to FIG. 6, it can be seen that the tensioner 26 can apply forces to the idler wheel(s) 22 by coupling to the idler wheel(s) 22 through an idler yoke 46 connected to the cylinder 30 and also connected to an idler axle 48 (shown in FIG. 2) defining an axis of rotation for the idler wheel(s) 22. Forces applied to the tensioner 26 can thus be transmitted to and from the idler wheel(s) 22 through the connection of the idler axle 48 to the tensioner 26 via idler yoke 46, allowing adjustment of the idler wheel(s) 22 during operation of the work vehicle 10.

When the recoiler 28 forces the idler wheel(s) 22 back into its original operating position from a compressed position, the outward extension of the recoiler 28 on the idler wheel(s) 22 is normally limited by a stop (such as end 44) formed in the recoiler 28 or by the track 18 tightening and preventing further extension of the idler wheel(s) 22. When the movement of the idler wheel(s) 22 suddenly stops, a loud noise and large shock can be created that transmits throughout the vehicle 10 and disturbs an operator in the driver compartment 22. The operator may believe that there has been a malfunction in the vehicle 10, and cease operation of the vehicle 10 to alert service personnel to find a malfunction that does not exist. Further, the resulting shock from the sudden impact and stopping of the idler wheel(s) 22 movement can damage the undercarriage system 13 due to cracks, denting, and loosening of joints in the undercarriage system 13 around, for example, the sprocket 16, reducing the lifespan of the undercarriage system 13.

Figure 3:
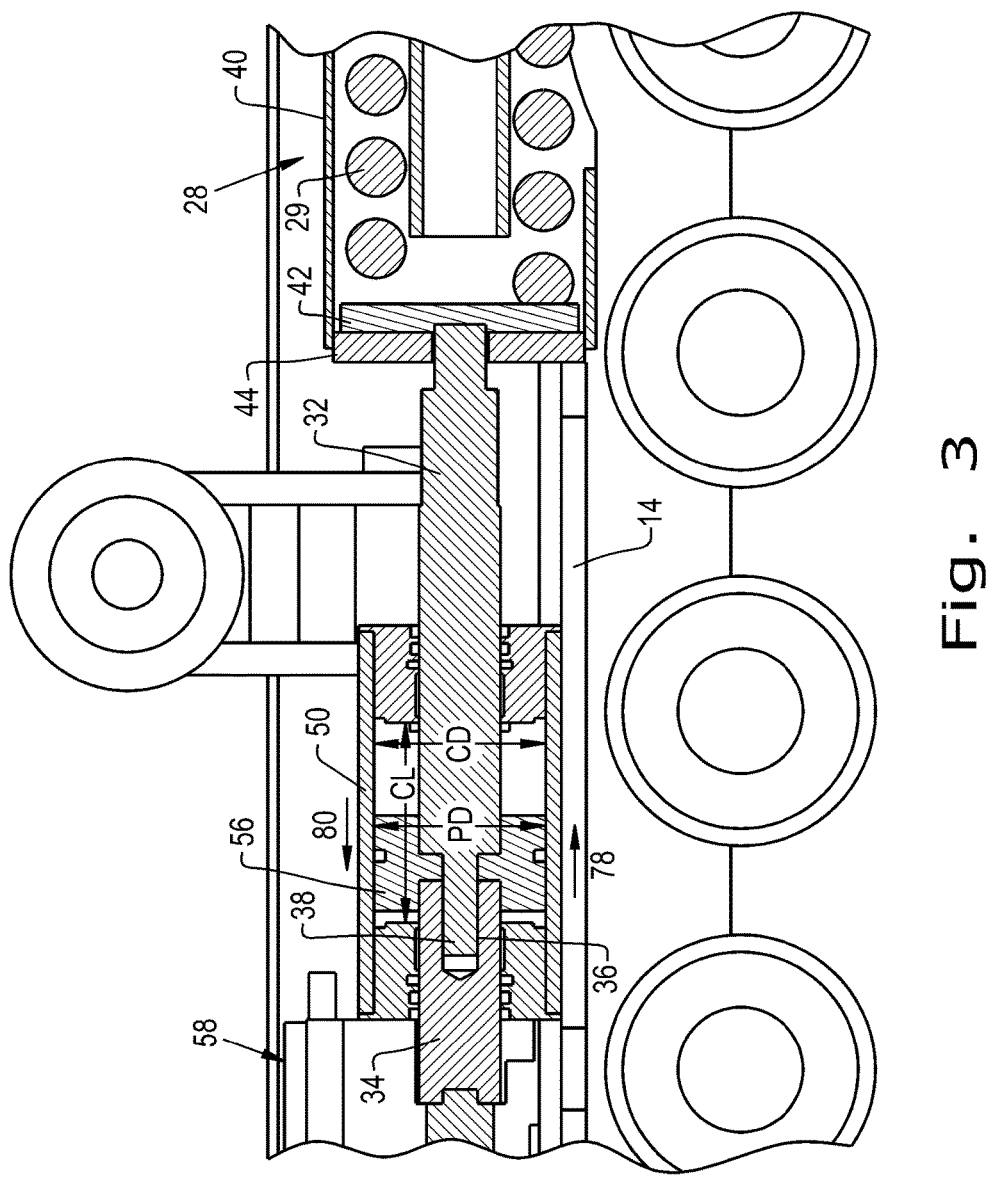
FIG. 3 is an enlargement of a portion of the cross-sectional view shown in FIG. 2.
Figure 4:
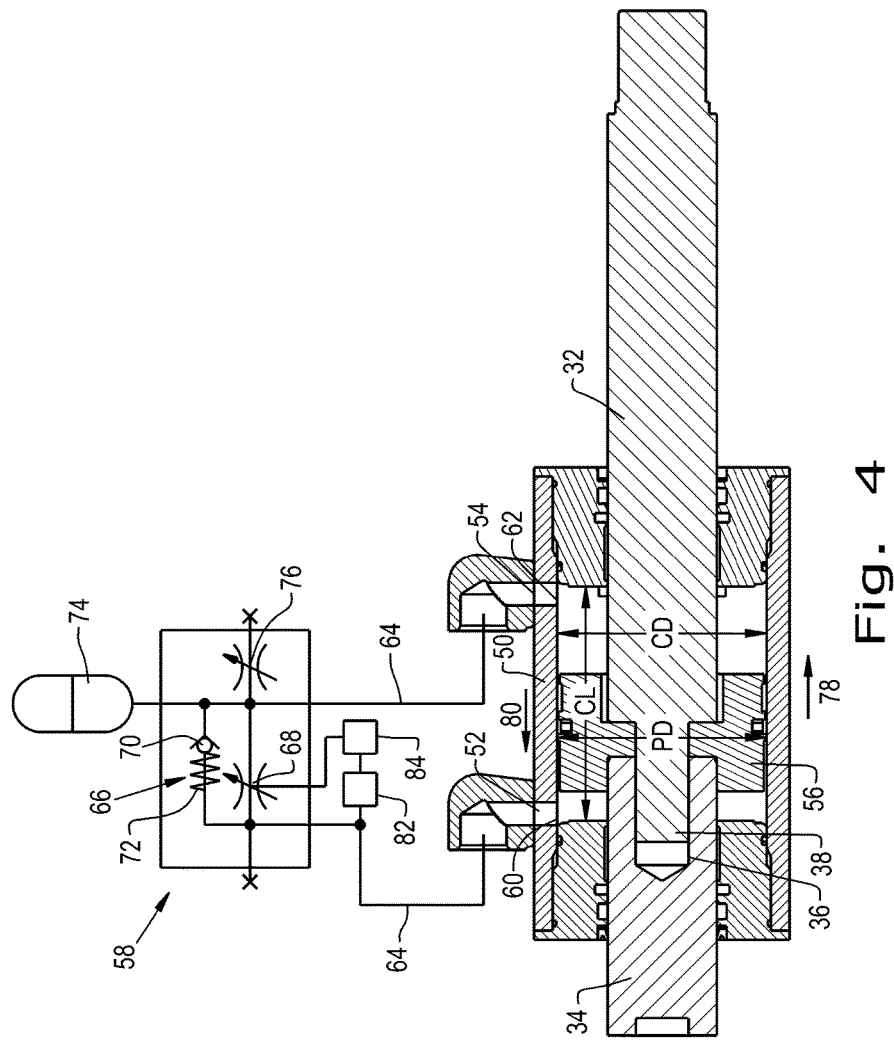
FIG. 4 is a cross-sectional view of a fluid chamber of the fluid damper shown in FIGS. 2-3 connected to a restricting circuit, which is represented as a fluid flow diagram.

To reduce the occurrence of the loud noise and large shock, and referring now to FIGS. 2-4, the idler system 20 according to the present invention includes a fluid damper 51 which is attached to the track frame 14 and is coupled to the tensioner 26 and/or the recoiler 28. The fluid damper 51 includes a fluid chamber 50, shown as a cylinder, that has a first port 52 and a second port 54, a piston 56 coupled to the tensioner 26 and/or recoiler 28 placed within the fluid chamber 50, and a restriction circuit 58 fluidly connected to the first port 52 and the second port 54. While the fluid chamber 50 is shown as a cylinder, the fluid chamber 50 can have any suitable shape that allows the piston 56 within the fluid chamber 50 to couple to the tensioner 26 and/or recoiler 28. While the tensioner 26 is shown as being coupled to the recoiler 28 within the fluid chamber 50 and the piston 56 is shown as coupling to the recoiler rod 32 within the fluid chamber 50, it should be appreciated that the coupling between the tensioner 26 and recoiler 28 does not need to occur in the fluid chamber 50 and the piston 56 within the fluid chamber 50 can couple to the tensioner 26, the recoiler 28 (as shown), or both. As can be seen in FIGS. 3-4, the piston 56 can have a piston diameter PD that is roughly equivalent to a cylinder diameter CD of the fluid chamber 50, when the fluid chamber 50 is a cylinder, to form a substantially fluid-tight seal with the walls of the fluid chamber 50, splitting the fluid chamber 50 into two sub-chambers, with each sub-chamber being on one side of the piston 56. This allows movement of the piston 56, through coupling to the tensioner 26 and/or recoiler 28, to displace fluid in the fluid chamber 50 in the direction of movement, forcing the fluid to move in the forced direction. The fluid can be, for example, oil or other hydraulic fluid filling the fluid chamber 50 and restriction circuit 58, which will be described further herein.

Referring specifically now to FIG. 4, it can be seen that the first port 52 and second port 54 can be formed in the fluid chamber 50 at opposite ends 60, 62 of the fluid chamber 50. The reason for forming the ports 52 and 54 at opposite ends 60 and 62 will be further described herein. The ports 52 and 54 can be roughly equal in size, so fluid flow through either port 52 or 54 is not restricted by a size difference in the ports 52 and 54. Each port 52 and 54 connects to the restriction circuit 58, utilizing hoses 64 or other suitable elements, so the restriction circuit 58 and fluid chamber 50 can form a closed fluid circuit. The closed fluid circuit can be filled with the previously described fluid so movement of the piston 56 in the fluid chamber 50 displaces fluid in the fluid chamber 50 and causes fluid flow throughout the closed fluid circuit. To ensure that the fluid in the closed fluid circuit flows through the closed fluid circuit as the piston 56 moves, rather than the fluid compressing, the fluid in the closed fluid circuit can be a non-compressible fluid, such as the previously described oil or other hydraulic fluid.

As can be seen, the restriction circuit 58, which is shown as a fluid flow diagram in FIG. 4, can include a check valve 66 and a restriction orifice 68 that are arranged in parallel within the restriction circuit 58. The restriction circuit 58 can be, for example, a valve manifold or other similar element having one or more fluid flow paths within and having a check valve 66 and a restriction orifice 68. The check valve 66 can be any type of valve that allows substantially unrestricted fluid flow therethrough in one direction, and substantially prevents fluid flow in the opposite direction. As shown in FIG. 4, the check valve 66 is arranged such that fluid flow through the closed fluid circuit is prevented in a fluid flow direction through the first port 52 toward the second port 54 by a ball 70 of the check valve 66, causing any fluid flow in this direction to be forced through the restriction orifice 68. Similarly, fluid flow through the closed fluid circuit in a fluid flow direction through the second port 54 toward the first port 52 is substantially unrestricted by the check valve 66, as the fluid flow can force the ball 70 to compress a valve spring 72 of the check valve 66 and allow fluid flow through the check valve 66. The restriction orifice 68, on the other hand, always restricts fluid flow therethrough by having a reduced opening size compared to other flow paths through the restriction circuit 58. The restriction orifice 68 can be a fixed size opening or be an adjustable size opening that will allow an operator to adjust the magnitude of restriction of fluid flow through the restriction orifice 68. Adjusting the size of the restriction orifice 68 may occur, for example, in response to temperature changes of the fluid in the fluid chamber 50 affecting the fluid viscosity, which is described further herein. As is known, a larger sized restriction orifice 68 will be less restrictive to fluid flow than a relatively smaller sized restriction orifice, so it can be useful for an operator to adjust the size of the restriction orifice 68 to adjust the fluid flow restriction through the restriction orifice 68, the reasons for which are further described herein. In this sense, the restriction orifice 68 passively restricts fluid flow therethrough, as the geometry of the restriction orifice 68 causes the restricted fluid flow therethrough and no additional energy is required to restrict the fluid flow through the restriction orifice 68. The restriction circuit 58 can also be connected to an accumulator 74 that will compensate for changes in fluid volume within the closed fluid circuit and can also have a shut-off valve 76 that allows for the addition of fluid to the closed fluid circuit or the purging of air from the closed fluid circuit.

During operation, the fluid damper 51 allows for compressing forces to be applied to the recoiler 28 with relatively little resistance while the subsequent forces applied by the recoiler 28 to the idler wheel(s) 22 are damped. This is due to the piston 56 displacing the fluid in the fluid chamber 50 as the piston 56 moves, causing the movement of the piston 56 to force the fluid through the ports 52, 54 and restriction circuit 58. When the piston 56 moves, for example, in a first direction, denoted by arrow 78, toward the spring 29 of the recoiler 28, corresponding to a compressing force acting on the idler wheel(s) 22, the piston 56 causes fluid in the fluid chamber 50 to flow in the first direction 78 as well. Since the fluid chamber 50 and restriction circuit 58 are a closed fluid circuit, the piston 56 forces the fluid through the second port 54 and toward the first port 52 as the piston 56 moves in the first direction 78. As previously described, fluid flow in this manner is substantially unrestricted due to the check valve 66 being arranged to allow substantially unrestricted fluid flow from the second port 54 toward the first port 52. The substantially unrestricted fluid flow through the closed fluid circuit allows the recoiler rod 32 to force the pressing plate 42 to compress the spring 29 with little fluid resistance occurring between the fluid in the fluid chamber 50 and the piston 56, which is coupled to the recoiler rod 32 either directly or indirectly.

On the other hand, when the compressing force is reduced and/or removed and the recoiler 28 forces the recoiler rod 32, and coupled piston 56, in a second direction, designated by arrow 80, that is opposite to the first direction 78, the piston 56 displaces fluid in the fluid chamber 50 in a manner that causes the fluid to flow in the closed fluid circuit through the first port 52 toward the second port 54. Fluid flow in this direction is not allowed through the check valve 66, as previously described, and thus all fluid flow in this direction must pass through the restriction orifice 68. Since the restriction orifice 68 has a reduced opening size compared to the ports 52, 54, the restriction orifice 68 is a chokepoint in the flow path that does not allow the fluid to freely flow therethrough. In other words, the restriction orifice 68 causes fluid flow through the closed fluid circuit to be a restricted fluid flow when the restriction orifice 68 is in the only fluid flow path that the fluid can take. Due to the restriction of fluid flow through the restriction orifice 68 when the piston 56 moves in the second direction 80, the fluid in the fluid chamber 50 provides substantial fluid resistance to the movement of the piston 56 through the fluid chamber in the second direction 80. The rate of the piston 56 moving through the fluid chamber 50, therefore, depends on the rate of fluid displaced by the moving piston 56 forcing fluid in the closed fluid circuit through the restriction orifice 68. If the restriction orifice 68 is made very small, for example, the rate of fluid passing through the restriction orifice 68 will be decreased, compared to a larger sized restriction orifice, and the movement speed of the piston 56 in the second direction 80 will be decreased as well. The fluid resistance to the piston 56 moving through the fluid chamber 50 in the second direction 80 slows down the movement speed of the piston 56 and coupled tensioner 26, also slowing down the extension of the recoiler 28 and idler wheel(s) 22 back to the original operating position. The reduced movement speed of the elements can reduce the amount of noise and shock that transmit through the work vehicle 10 by such a degree that the operator is not even aware that the recoiler 28 has forced the idler wheel(s) 22 back to the original operating position. The fluid damper 51 of the present invention, therefore, can allow the spring 29 to become compressed with little interference while damping the release of the energy in the spring 29 to return the idler wheel(s) 22 back to the original operating position.

As the damping ability of the fluid damper 51 depends on the flow of fluid through the closed fluid circuit of the fluid damper 51 and corresponding resistance to the movement of the piston 56 through the fluid chamber 50, it should be appreciated that many adjustments can be made to the fluid damper 51 to achieve desired damping characteristics. For example, the axial distance between ports 52 and 54 can be equal to the maximum recoil distance that the recoiler 28 moves the piston 56 as the recoiler 28 forces the idler wheel(s) 22 back to the original operating position. Similarly, a chamber length CL of the fluid chamber 50 can be equal to the maximum recoil distance so the movement of the piston 56 in the axial direction cannot exceed the maximum recoil distance. The restriction circuit 58 can also be configured as desired to permit a substantially unrestricted fluid flow through the closed fluid circuit when the piston 56 moves in the first direction 78 and a restricted fluid flow through the closed fluid circuit when the piston 56 moves in the second direction 80 opposite the first direction 78. The restricted fluid flow can be caused in the closed fluid circuit by a passive element, such as the restriction orifice 68, which does not require activation to restrict the fluid flow, or a selectively activated element that is controlled to manually or automatically restrict fluid flow in the closed fluid circuit.

As can be seen in FIG. 4, a temperature sensor 82 can be fluidly connected to the closed fluid circuit, for example, by being fluidly connected to the hose 64 fluidly connecting the first port 52 to the restriction circuit 58. The temperature sensor 82 can be coupled to a controller 84 which is configured to adjust the size of the restriction orifice 68. The restriction orifice 68 can be adjusted, for example, by advancing an actuated element (not shown) in one direction in the restriction circuit 58 to decrease the size of the restriction orifice 68 and advancing the actuated element in the opposite direction to increase the size of the restriction orifice 68, with the controller 84 controlling how the actuated element is advanced. The temperature sensor 82 allows the controller 84 to measure the temperature of the fluid in the closed fluid circuit and, if desired, determine the viscosity of the fluid in the closed fluid circuit based on the temperature and fluid type. As is known, the viscosity of a fluid is generally inversely related to the temperature of the fluid, with higher fluid temperatures tending to lower the fluid viscosity. As the damping ability of the fluid damper 50 is affected by the ability of the fluid in the closed fluid circuit to resist the movement of the piston 56 due to viscosity, variable viscosities caused by temperature changes can cause undesired damping ability of the fluid damper 50. The controller 84 can compensate for variable viscosities by adjusting the size of the restriction orifice 68 in response to a measured temperature and/or determined viscosity of the fluid in the closed fluid circuit. For example, the controller 84 can be programmed to make the restriction orifice 68 a certain size at a first temperature, and then decrease the size of the restriction orifice 68 at a second temperature which is higher than the first temperature in order to maintain an equivalent restricted fluid flow through the closed fluid circuit despite a lowered viscosity of the fluid when the fluid is the higher second temperature rather than the first temperature. The controller 84 can be programmed, for example, to continuously adjust the size of the restriction orifice 68 by utilizing an algorithm correlating the temperature and/or viscosity of the fluid to an associated restriction opening size, so each change in the fluid temperature and/or viscosity causes a corresponding change in the size of the restriction orifice 68. Alternatively, the controller 84 can be programmed to adjust the size of the restriction orifice 68 at certain fluid temperature setpoints so the controller 84 will only adjust the size of the restriction orifice 68 to a certain size once the temperature of the fluid in the closed fluid circuit reaches a certain temperature. It should be appreciated that the described ways of the controller 84 adjusting the size of the restriction orifice 68 are exemplary only, and the controller 84 can adjust the size of the restriction orifice 68 in response to events other than temperature/viscosity change, such as the fluid in the closed fluid circuit being replaced.

Figure 5:
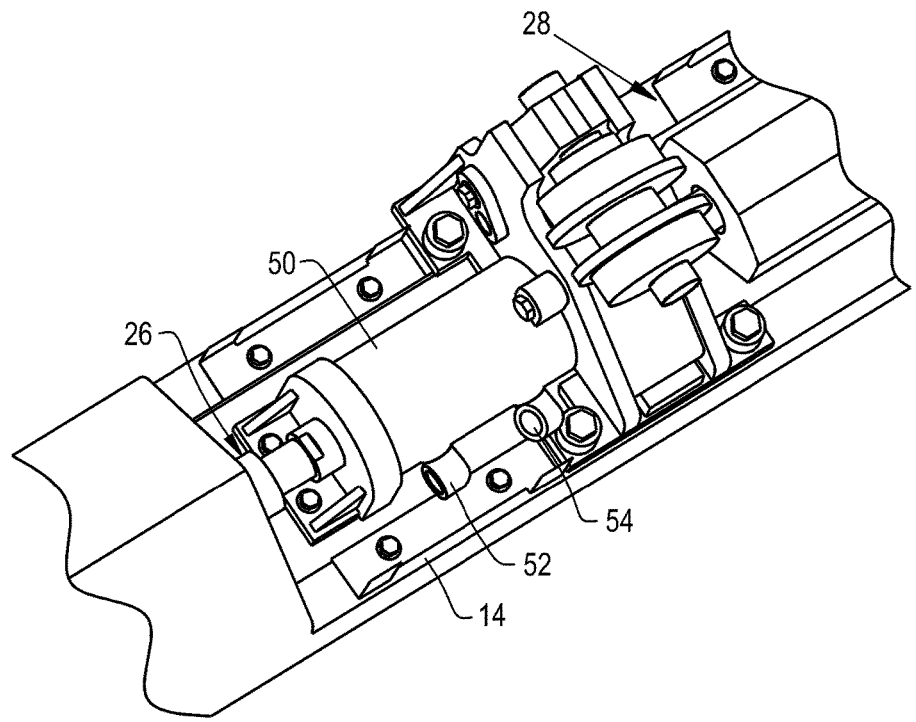
FIG. 5 is a perspective view of a portion of a fluid damper shown in FIGS. 2-4.

Referring now to FIG. 5, the fluid chamber 50 is shown attached to the track frame 14 and coupled to the tensioner 26 and the recoiler 28. The restriction circuit 58 is not shown in FIG. 5, but can also be attached to the track frame 14, as shown in FIGS. 2-3. Since the fluid flow resistance in the fluid damper 51 arises from the flow restriction at the restriction orifice 68, the damped force caused by the piston 56 flowing against the resisting fluid in the fluid chamber 50 gets transmitted to the fluid damper 51. The fluid damper 51 being attached to the track frame 14 allows the fluid damper 51 to be grounded to the track frame 14, and the energy of the recoiler 28 forcing the idler wheel(s) 22 back to the original operating position is grounded in the fluid damper 51 to the track frame 14. This allows for the recoiler 28 to operate as it does in currently known systems, but significantly reduces the accompanying loud noise and shock. It should therefore be appreciated that the fluid damper 51 according to the present invention can be incorporated in many different types of track vehicles with tensioners and recoilers with relative ease and few changes to the track vehicle design.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A track vehicle, comprising:
   a track frame;
   a driving wheel carried by said track frame and configured to rotate;
   a track rotatably engaged with said driving wheel;
   at least one idler wheel engaged with said track;
   a tensioner coupled to said at least one idler wheel and configured to force said at least one idler wheel into engagement with said track;
   a recoiler coupled to said tensioner; and
   a fluid damper attached to said track frame and coupled to said tensioner and said recoiler, said fluid damper comprising:
      a fluid chamber having a first port and a second port;
      a piston mechanically coupled to at least one of said tensioner and said recoiler within said fluid chamber, said piston splitting said fluid chamber into a first sub-chamber fluidly coupled to said first port and a second sub-chamber fluidly coupled to said second port; and
      a restriction circuit fluidly connected to said first port and said second port and configured to form a closed fluid circuit such that fluid can move through the circuit between the first sub-chamber and said second sub-chamber, said restriction circuit configured to permit a substantially unrestricted fluid flow through said closed fluid circuit when said piston moves in a first direction and a restricted fluid flow through said closed fluid circuit when said piston moves in a second direction opposite to said first direction.

2. The track vehicle according to claim 1, wherein said restriction circuit includes a check valve and a restriction orifice.

3. The track vehicle according to claim 2, wherein said check valve and said restriction orifice are arranged in parallel.

4. The track vehicle according to claim 2, wherein said restriction orifice has an adjustable size opening.

5. The track vehicle according to claim 4, further comprising a temperature sensor fluidly connected to said closed fluid circuit and a controller coupled to said temperature sensor.

6. The track vehicle according to claim 5, wherein said controller is configured to adjust said adjustable size opening based on at least one of a temperature and a viscosity of a fluid in said closed fluid circuit.

7. The track vehicle according to claim 1, wherein said first port is formed adjacent a first end of said fluid chamber and said second port is formed adjacent a second end of said fluid chamber opposite said first end.

8. The track vehicle according to claim 1, wherein said recoiler is a compression spring.

9. The track vehicle according to claim 1, wherein said piston travels toward said recoiler in said first direction and said piston travels toward said idler wheel in said second direction.

10. The track vehicle according to claim 9, wherein fluid flow through said closed fluid circuit is restricted by an orifice when said piston moves in said second direction.

11. An idler system for a track vehicle, comprising:
   an idler wheel;
   a tensioner coupled to said idler wheel;
   a recoiler coupled to said tensioner; and
   a fluid damper mechanically coupled to said tensioner and said recoiler, said fluid damper comprising:
      a fluid chamber having a first port and a second port;
      a piston coupled to at least one of said tensioner and said recoiler within said fluid chamber, said piston splitting said fluid chamber into a first sub-chamber fluidly coupled to said first port and a second sub-chamber fluidly coupled to said second port; and
      a restriction circuit fluidly connected to said first port and said second port and configured to form a closed fluid circuit, said restriction circuit configured to permit a substantially unrestricted fluid flow through said closed fluid circuit from the first port toward the second port when said piston moves in a first direction and a restricted fluid flow through said closed fluid circuit when said piston moves in a second direction opposite to said first direction.

12. The idler system according to claim 11, wherein said restriction circuit includes a check valve and a restriction orifice.

13. The idler system according to claim 12, wherein said check valve and said restriction orifice are arranged in parallel.

14. The idler system according to claim 12, wherein said restriction orifice is one of an adjustable size opening and a fixed size opening.

15. The idler system according to claim 14, further comprising a temperature sensor fluidly connected to said closed fluid circuit and a controller coupled to said temperature sensor.

16. The idler system according to claim 15, wherein said restriction orifice is an adjustable size opening and said controller is configured to adjust said adjustable size opening based on at least one of a temperature and a viscosity of a fluid in said closed fluid circuit.

17. The idler system according to claim 11, wherein said first port is formed adjacent a first end of said fluid chamber and said second port is formed adjacent a second end of said fluid chamber opposite said first end.

18. The idler system according to claim 11, wherein said recoiler is a spring.

19. The idler system according to claim 11, wherein said piston travels toward said recoiler in said first direction and said piston travels toward said idler wheel in said second direction.

20. The idler system according to claim 19, wherein fluid flow through said closed fluid circuit is restricted by an orifice when said piston moves in said second direction.

* * * * *